US008301449B2

(12) United States Patent
He et al.

(10) Patent No.: US 8,301,449 B2
(45) Date of Patent: Oct. 30, 2012

(54) MINIMUM CLASSIFICATION ERROR TRAINING WITH GROWTH TRANSFORMATION OPTIMIZATION

(75) Inventors: Xiaodong He, Issaquah, WA (US); Li Deng, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1450 days.

(21) Appl. No.: 11/581,673

(22) Filed: Oct. 16, 2006

(65) Prior Publication Data
US 2008/0091424 A1    Apr. 17, 2008

(51) Int. Cl.
*G10L 15/00*    (2006.01)

(52) U.S. Cl. ..... 704/257; 704/251; 704/256; 704/256.1; 704/256.2; 704/256.4; 704/256.6

(58) Field of Classification Search ........... 704/9, 256.8, 704/251, 257, 256.7, 256.4, 256, 244, 243, 704/240
See application file for complete search history.

(56) References Cited

U.S. PATENT DOCUMENTS

| | | | | |
|---|---|---|---|---|
| 5,072,452 A * | 12/1991 | Brown et al. | ............... | 704/256.4 |
| 5,502,774 A * | 3/1996 | Bellegarda et al. | ............ | 382/159 |
| 5,579,436 A * | 11/1996 | Chou et al. | ..................... | 704/244 |
| 5,606,645 A * | 2/1997 | Matsuura | ....................... | 704/256 |
| 5,675,706 A * | 10/1997 | Lee et al. | ....................... | 704/256 |
| 5,797,123 A * | 8/1998 | Chou et al. | .................. | 704/256.5 |
| 5,839,105 A * | 11/1998 | Ostendorf et al. | ............ | 704/256 |
| 6,044,344 A * | 3/2000 | Kanevsky | .................. | 704/256.7 |
| 6,076,057 A | 6/2000 | Narayanan et al. | | |
| 6,076,058 A | 6/2000 | Chengalvarayan | | |
| 6,112,175 A | 8/2000 | Chengalvarayan | | |
| 6,125,345 A * | 9/2000 | Modi et al. | ..................... | 704/240 |
| 6,272,462 B1 | 8/2001 | Nguyen | | |
| 6,374,216 B1 | 4/2002 | Micchelli et al. | | |
| 6,466,908 B1 * | 10/2002 | Baggenstoss | .................. | 704/256 |
| 6,490,555 B1 * | 12/2002 | Yegnanarayanan et al. | .. | 704/231 |
| 6,567,776 B1 | 5/2003 | Chang et al. | | |
| 6,925,432 B2 | 8/2005 | Lee et al. | | |
| 7,216,077 B1 * | 5/2007 | Padmanabhan et al. | ...... | 704/240 |
| 7,433,820 B2 * | 10/2008 | Garg et al. | ................. | 704/256.8 |
| 7,565,282 B2 * | 7/2009 | Carus et al. | ....................... | 704/9 |
| 2003/0055640 A1 * | 3/2003 | Burshtein et al. | ............. | 704/235 |
| 2004/0267530 A1 * | 12/2004 | He et al. | ........................ | 704/256 |

(Continued)

OTHER PUBLICATIONS

Chou, Wu. "Discriminant-Function-based Minimum Recognition Error Rate Pattern-Recognition Approach to Speech Recognition", Aug. 2000, vol. 88, No. 8, IEEE, pp. 1201-1223.*

(Continued)

*Primary Examiner* — Douglas Godbold
*Assistant Examiner* — Mark Villena
(74) *Attorney, Agent, or Firm* — Westman, Champlin & Kelly, P.A.; Theodore M. Magee (57) ABSTRACT

Hidden Markov Model (HMM) parameters are updated using update equations based on growth transformation optimization of a minimum classification error objective function. Using the list of N-best competitor word sequences obtained by decoding the training data with the current-iteration HMM parameters, the current HMM parameters are updated iteratively. The updating procedure involves using weights for each competitor word sequence that can take any positive real value. The updating procedure is further extended to the case where a decoded lattice of competitors is used. In this case, updating the model parameters relies on determining the probability for a state at a time point based on the word that spans the time point instead of the entire word sequence. This word-bound span of time is shorter than the duration of the entire word sequence and thus reduces the computing time.

17 Claims, 6 Drawing Sheets

U.S. PATENT DOCUMENTS

| | | | |
|---|---|---|---|
| 2006/0074656 A1* | 4/2006 | Mathias et al. | 704/243 |
| 2006/0100874 A1 | 5/2006 | Oblinger et al. | |
| 2006/0195321 A1* | 8/2006 | Deligne et al. | 704/257 |
| 2006/0230140 A1* | 10/2006 | Aoyama et al. | 709/224 |
| 2008/0004877 A1* | 1/2008 | Tian | 704/251 |
| 2008/0052075 A1* | 2/2008 | He et al. | 704/256 |

OTHER PUBLICATIONS

Wu Chou, "Discriminant-Function-Based Minimum Recognition Error Rate Pattern-Recognition Approach to Speech Recognition", Aug. 2000, IEEE, vol. 88, No. 8.*

Xiaodong He and Wu Chou, "Minimum Classification Error Linear Regression for Acoustic Model Adaptation of Continuous Density HMMs", 2003, IEEE.*

Steve Young, "Acoustic Modelling for Large Vocabulary Continuous Speech Recognition", 1999, pp. 1-23.*

Achim Sixtus et al., "High Quality Word Graphs Using Forward-Backward Pruning", 1999, pp. 1-4.*

Hao Huang et al., "Minimum Phoneme Error Based Filter Bank Analysis for Speech Recognition", Jun. 2006, pp. 1081-1085.*

Chen et al., "An N-Best Candidates-Based Discriminative Training for Speech Recognition Applications," Jan. 1994, IEEE Trans. Speech Audio Processing, pp. 206-216, vol. 2, No. 1, part II.

Chesta et al., "Discriminative Training of Hidden Markov Models Using a Classification Measure Criterion," ICASSP '98, pp. 449-452.

Salmela et al., "On String Level MCE Training in MLP/HMM Speech Recognition System," IEEE SMC '99 Conference Proceedings.

Valtechev et al., "Lattice-Based Discriminative Training for Large Vocabulary Speech Recognition," Proceedings ICASSP '96, pp. 605-608.

L. Bahl, et al., "A Maximum Likelihood Approach to Continuous Speech Recognition," IEEE Transactions on Pattern Analysis and Machine Intelligence, PAMI-5, 179-190.

l. Deng et al, "A Generative Modeling Framework for Structured Hidden Speech Dynamics," Neural Information Processing System (NIPS) Workshop, Whistler, BC, Canada, Dec. 2005.

P.S. Gopoalakrishnan et al., "An Inequality for Rational Functions with Applications to Some Statistical Estimation Problems," IEEE Trans. Information Theory, vol. 37, pp. 107-113, Jan. 1991.

X. He et al., "Minimum Classification Error Linear Regression for Acoustic Model Adaptation of Continuous Density HMMs," Proc. ICASSP, Apr. 2003.

B.-H. Juang et al., "Discriminative Learning for Minimum Error Classification," IEEE Trans. on SP., vol. 40, No. 12, 1992, pp. 3043-3054.

D. Povey et al., "Minimum Phone Error and I-Smoothing for Improved Discriminative Training," Proc. ICASSP, 2002.

L. Deng et al., "Analysis and Comparison of Two Feature Extraction/Compensation Algorithms," IEEE Signal Processing Letters, vol. 12, No. 6, Jun. 2005, pp. 477-480.

A. Gunawardana et al., "Discriminative Speaker Adaptation with Conditional Maximum Likelihood Linear Regression," Proc. Eurospeech, 2001.

W. Macherey et al., "Investigations on Error Minimizing T raining Criteria for Discriminative Training in Automatic Speech Recognition," Proc. Interspeech, Sep. 2005, Lisbon, Portugal, pp. 2133-2136.

E. McDermott T. Hazen et al., "Discriminative Training for Large Vocabulary Speech Recognition Using Minimum Classification Error," IEEE Trans. Speech and Audio Processing, vol. 14, 2006.

D. Povey, et al. "MMI-MAP and MPE-MAP for Acoustic Model Adaptation," Proc. Eurospeech 2003.

C. Rathinavalu et al., "Speech Trajectory Discrimination Using the Minimum Classification Error Learning," IEEE Trans. Speech and Audio Processing, vol. 6, No. 6, Nov. 1998, pp. 505-515.

J.L. Roux et al., "Optimization for Discriminative Training," Proc. Interspeech, 2005.

P.C. Woodland et al., "Large Scale Discriminative Training for Speech Recognition," Proc. ITRW ASR, ISCA, 2000.

Chou, 2003, "Minimum Classification Error Approach in Pattern Recognition," in Pattern Recognition in Speech and Language Processing, 2003, CRC Press, pp. 1-49.

Li Deng et al, "Use of Incrementally Regulated Discriminative Margins in MCE Training for Speech Recognition," Proceedings of InterSpeech 2006, September.

* cited by examiner

MINIMUM CLASSIFICATION ERROR TRAINING WITH GROWTH TRANSFORMATION OPTIMIZATION

BACKGROUND

Hidden Markov Models (HMMs) are a well established framework for a variety of pattern recognition applications, including, most prominently, speech recognition applications. Hidden Markov Models consist of interconnected states where each state is represented by a Gaussian distribution or by a mixture of Gaussians. Speech units, such as phonemes, are associated with one or more HMM states. Typically, the means and variances of the distributions for the HMMs are learned from training data.

One technique for training HMM parameters is to use a maximum likelihood criterion based on an Expectation-Maximization algorithm. Under this technique, the parameters are adjusted to maximize the likelihood of a set of training data. However, due to data sparseness, maximum likelihood does not produce HMM parameters that are ideal for data that is not well-represented in the training data.

Another method of training HMM parameters is known as discriminative training. In discriminative training, the goal is to set the HMM parameters so that the HMM is able to discriminate between a correct word sequence and one or more incorrect word sequences.

One specific form of discriminative training is known as minimum classification error (MCE) training. In MCE training, the HMM parameters are trained by optimizing an objective function that is closely related to classification errors, where a classification error is the selection of an incorrect word sequence instead of a correct word sequence. Although MCE training has been performed before, conventional MCE optimization has been based on a sequential gradient-decent based technique named Generalized Probabilistic Decent (GPD), which optimizes the MCE objective function as a highly complex function of the HMM parameters. Such gradient-based techniques often require special and delicate care for tuning the parameter-dependent learning rate.

Another form of discriminative training is known as maximization of mutual information (MMI). Under MMI, an objective function related to the mutual information is optimized using one of a set of optimization techniques. One of these techniques is known as Growth Transformation (GT) or Extended Baum-Welch (EBW). However, GT/EBW was developed for rational functions such as mutual information. Because MCE does not provide a rational function, growth transformation/extended Baum-Welch optimization has not been applied to minimum classification error training.

The discussion above is merely provided for general background information and is not intended to be used as an aid in determining the scope of the claimed subject matter.

SUMMARY

Model parameters are updated using update equations based on growth transformation optimization of a minimum classification error objective function. Using a decoded list of N-Best competitor word sequences, updating the model parameters involves using weights for each competitor word sequence that can be any positive real value. Using a decoded lattice of competitors, updating the model parameters relies on determining the probability for a state at a time point based on the word that spans the time point instead of the entire word sequence.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
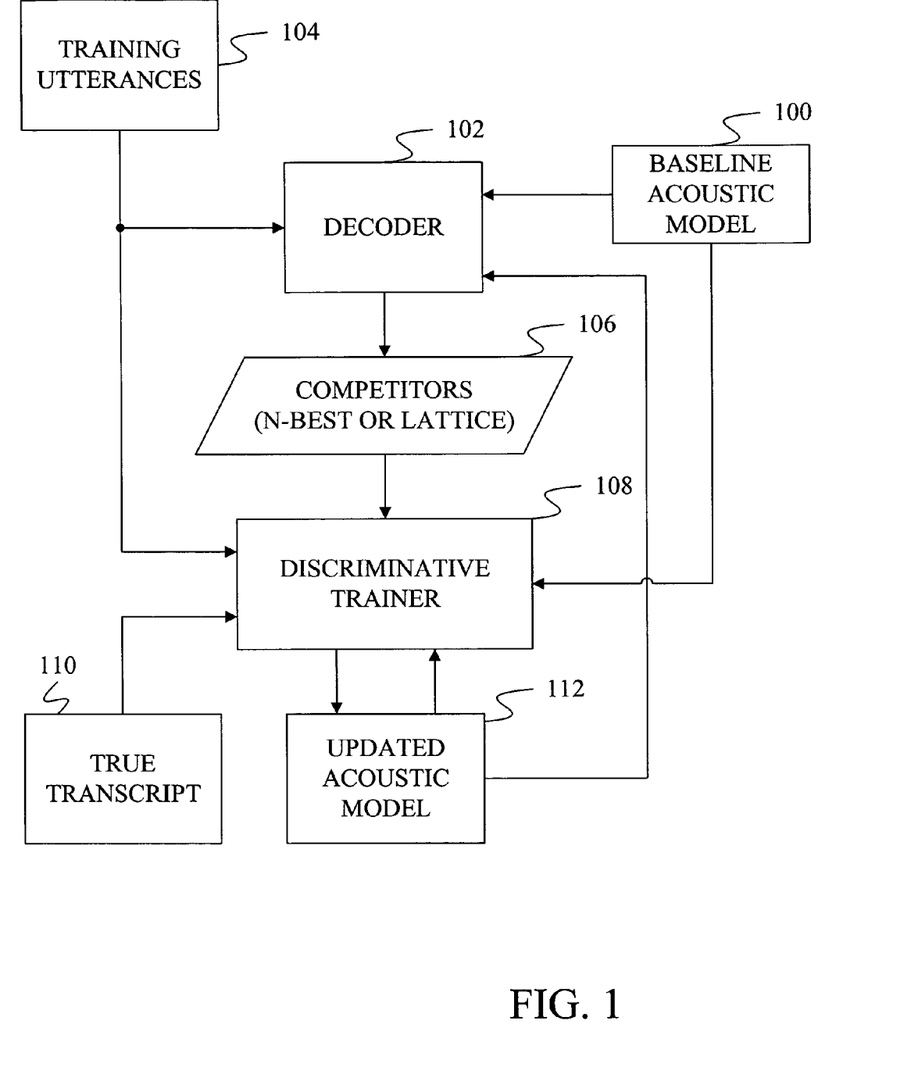
FIG. 1 is a block diagram of a discriminative training system.
Figure 2:
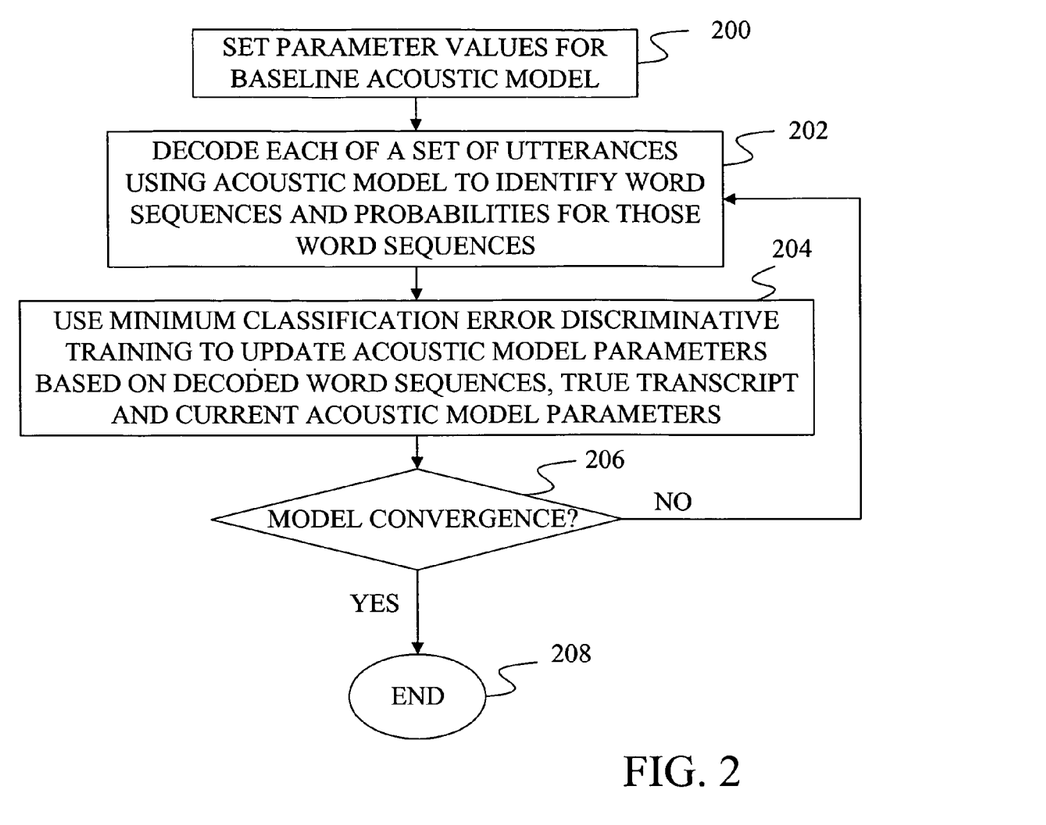
FIG. 2 is a flow diagram of a method of discriminative training.

FIG. 1 provides a block diagram of a general system for performing discriminative training to train a set of acoustic models. FIG. 2 provides a flow diagram of the discriminative training of FIG. 1.

In step 200 of FIG. 2, parameter values for a set of baseline acoustic models 100 are set. Such baseline acoustic models can be formed using maximum likelihood training as is known in the art. At step 202, a decoder 102 decodes each of a set of training utterances 104 using baseline acoustic models 100 to form at least one possible word sequence that can be represented by the training utterance. In addition, decoder 102 provides a separate probability for each word sequence, where the probability describes the probability of the training utterance given the word sequence.

The word sequences identified for an utterance by decoder 102 are listed as competitors 106, since each word sequence is competing against the other word sequences to be identified as the correct word sequence for the utterance. Competitors 106 may be in the form of a list of N-Best word sequences or may be in the form of a lattice of word sequences. A lattice of word sequences is a compact representation of N-best word sequences because it can use a single word arc to represent the occurrence of a word in multiple word sequences.

Competitor word sequences 106 are provided to discriminative trainer 108 along with training utterances 104, baseline acoustic model 100 and a true transcript 110 of each utterance. At step 204, discriminative trainer 108 uses minimum classification error discriminative training to update the acoustic model parameters of baseline acoustic model 100 based on competitors 106, true transcript 110, training utterances 104 and baseline acoustic model 100. In particular, discriminative trainer 108 uses update equations that are formed by optimizing a minimum classification error objective function using a growth transform optimization technique as discussed in more detail below. Using the update equations, discriminative trainer 108 produces updated acoustic models 112.

At step 206, the method determines if the parameters of acoustic models 112 have converged. If they have not converged, updated acoustic models 112 are used by decoder 102 to again decode training utterances 104 to identify a new set of competitor word sequences 106 by returning to step 202. Discriminative trainer 108 then updates acoustic model 112 using the new competitors 106, the previous acoustic model 112, true transcript 110 and training utterances 104.

When the model parameters of acoustic models 112 have converged at step 206, the process ends at step 208 and the updated acoustic models 112 are provided as the final acoustic models, which may be used for speech recognition.

In the following, for utterance r, $S_r$ denotes the true transcript; "$s_r, s_r \neq S_r$" denotes a competitor word sequence, and $s_r$ without special annotation denotes any possible word sequence of utterance r, which can be either the true transcript $S_r$ or any competitor word sequence.

The minimum classification error discriminative training used in step 204 above is based on the following misclassification measure:

$$d_r(X_r, \Lambda) = -\log p_\Lambda(X_r, S_r) + \log \sum_{s_r, s_r \neq S_r} w(s_r) \cdot p_\Lambda(X_r, s_r) \quad \text{EQ. 1}$$

where $d_r(X_r, \Lambda)$ is the misclassification measure for utterance r based on a sequence of T feature vectors, $X_r = [x_1 \ldots x_t \ldots x_T]$, which represents the utterance and based on acoustic model parameters $\Lambda$, $p_\Lambda(X_r, S_r)$ is the joint probability of utterance feature vectors $X_r$ and true transcript $S_r$ based on acoustic model parameters $\Lambda$, $p_\Lambda(X_r, s_r)$ given the restriction $s_r \neq S_r$ is the joint probability of utterance feature vectors $X_r$ and a competitor word sequence $s_r$, $w(s_r)$ given the restriction $s_r \neq S_r$, is a non-negative weighting factor for competitor word sequence $s_r$, and the summation in the second term on the right is taken over all competitor word sequences that are not the true transcript. In the following sections, for the true transcript $S_r$, a value of 1 is assigned to $w(s_r)$ where $s_r = S_r$.

Using the misclassification measure of EQ. 1, a loss function for an N-Best version of MCE becomes:

$$l_r(d_r(X_r, \Lambda)) = \frac{\sum_{s_r, s_r \neq S_r} w(s_r) p_\Lambda(X_r, s_r)}{\sum_{s_r} w(s_r) p_\Lambda(X_r, s_r)} \quad \text{EQ. 2}$$

where the loss function $l_r(d_r(X_r,\Lambda))$ is for a single utterance r. The loss function has a value between zero and one and tends to have values that are either very close to zero or very close to one.

The loss function over the entire set of R training utterances becomes:

$$L(\Lambda) = \sum_{r=1}^{R} l_r(d_r(X_r, \Lambda)) \quad \text{EQ. 3}$$

where $L(\Lambda)$ has values between zero and R.

Minimizing the loss function of EQ. 3 is equivalent to maximizing the following objective function:

$$O(\Lambda) = R - L(\Lambda) = \sum_{r=1}^{R} \left[ 1 - \frac{\sum_{s_r, s_r \neq S_r} w(s_r) p_\Lambda(X_r, s_r)}{\sum_{s_r} w(s_r) p_\Lambda(X_r, s_r)} \right] \quad \text{EQ. 4}$$

$$= \sum_{r=1}^{R} \frac{w(S_r) p_\Lambda(X_r, S_r)}{\sum_{s_r} w(s_r) p_\Lambda(X_r, s_r)}$$

Note that the right hand term in EQ. 5 is a sum of rational functions rather than a rational function. As such, it is not amenable to growth transformation/extended Baum-Welch optimization.

To allow for growth transformation/extended Baum-Welch optimization, embodiments reformulate the objective function of EQ. 4 into a true rational function as:

$$O(\Lambda) = \frac{\sum_{s_1} \ldots \sum_{s_R} \prod_{r=1}^{R} w(s_r) p_\Lambda(X_1 \ldots X_R, s_1 \ldots s_R) \sum_{r=1}^{R} c(s_r)}{\sum_{s_1} \ldots \sum_{s_R} \prod_{r=1}^{R} w(s_r) p_\Lambda(X_1 \ldots X_R, s_1 \ldots s_R)} \quad \text{EQ. 5}$$

where $\Sigma_{s_1} \ldots \Sigma_{s_R}$ denotes nested summations, with each summand based on a different combination of competitors for the R utterances. For example, if there were only two utterances, and each utterance had two competitors and one true transcript such that $s_1 = [s_{1,1}, s_{1,2}, S_1]$ and $s_2 = [s_{2,1}, s_{2,2}, S_2]$, nine summands would be computed using the following combinations $(s_{1,1}, s_{2,1})$, $(s_{1,1}, s_{2,2})$, $(s_{1,1}, S_2)$, $(s_{1,2}, s_{2,1})$, $(s_{1,2}, s_{2,2})$, $(s_{1,2}, S_2)$, $(S_1, s_{2,1})$, $(S_1, s_{2,2})$, $(S_1, S_2)$. In equation 5, $s_r$ denotes the competitor or true transcript for utterance r for the current summand, $p_\Lambda(X_1 \ldots X_R, s_1 \ldots s_R)$ is the joint probability of all R training utterances and the corresponding set of word sequences for the current summand, and $$C(s_r) = \delta(s_r, S_r) \quad \text{EQ. 6}$$

where $\delta(s_r, S_r)$ is the Kronechker delta function that equals one if $s_r = S_r$ and zero otherwise.

Under growth transformation optimization, instead of optimizing the objective function of EQ. 5 directly, an auxiliary function is optimized where the auxiliary function is defined as:

$$F(\Lambda; \Lambda') = G(\Lambda) - O(\Lambda') H(\Lambda) + D \quad \text{EQ. 7}$$

where $F(\Lambda; \Lambda')$ is the auxiliary function, $G(\Lambda)$ is the numerator of the objective function, i.e., $$G(\Lambda) = \sum_{s_1} \ldots \sum_{s_R} \prod_{r=1}^{R} w(s_r) p_\Lambda(X_1 \ldots X_R, s_1 \ldots s_R) \sum_{r=1}^{R} c(s_r),$$

$H(\Lambda)$ is the denominator of the objective function, i.e., $$H(\Lambda) = \sum_{s_1} \ldots \sum_{s_R} \prod_{r=1}^{R} w(s_r) p_\Lambda(X_1 \ldots X_R, s_1 \ldots s_R),$$

$O(\Lambda')$ is the objective function using the previous parameter set $\Lambda'$ and D is a quantity that is independent of the parameter set.

The auxiliary function of EQ. 7 can be used to form a further auxiliary function that guarantees an increase in the auxiliary function when the further auxiliary function increases. This further auxiliary function is then maximized by taking the derivative of the further auxiliary function with respect to the mean and variance of each state of the Hidden Markov Model resulting in update equations of:

$$\mu_1 = \frac{\sum_{r=1}^{R}\sum_{t=1}^{T_r}\Delta\gamma(i,r,t)x_t + D_i\mu_i'}{\sum_{r=1}^{R}\sum_{t=1}^{T_r}\Delta\gamma(i,r,t) + D_i} \quad \text{EQ. 8}$$

$$\Sigma_i = \frac{\sum_{r=1}^{R}\sum_{t=1}^{T_r}[\Delta\gamma(i,r,t)(x_r-\mu_i)(x_r-\mu_i)^T] + D_i\Sigma_i' + D_i(\mu_i-\mu_i')(\mu_i-\mu_i')^T}{\sum_{r=1}^{R}\sum_{t=1}^{T_r}\Delta\gamma(i,r,t) + D_i} \quad \text{EQ. 9}$$

where $\mu_i$ is the mean for state i, $T_r$ is the number of time points or frames of utterance r, $x_t$ is the feature vector for utterance r at time point t, $\mu_i'$ is the mean for state i for the previous version of the acoustic model, $\Sigma_i$ is the variance for state i, $\Sigma_i'$ is the variance for the previous model for state i, and where:

$$\Delta\gamma(i,r,t) = \sum_{s_r} w(s_r)p_{\Lambda'}(s_r \mid X_r) \quad \text{EQ. 10}$$

$$\frac{Q(\Lambda')}{\sum_{s_r} w(s_r)p_{\Lambda'}(s_r \mid X_r)}\left[C(s_r) - \frac{p_{\Lambda'}(S_r \mid X_r)}{\sum_{s_r} w(s_r)p_{\Lambda'}(s_r \mid X_r)}\right]\gamma_{i,r,s_r}(t)$$

$$D_i = E \cdot \sum_{r=1}^{R}\left[\frac{Q(\Lambda')}{\sum_{s_r} w(s_r)p_{\Lambda'}(s_r \mid X_r)}\frac{p_{\Lambda'}(S_r \mid X_r)}{\sum_{s_r} w(s_r)p_{\Lambda'}(s_r \mid X_r)}\right. \quad \text{EQ. 11}$$

$$\left. \sum_{s_r}\left[w(s_r)p_{\Lambda'}(s_r \mid X_r)\sum_t[\gamma_{i,r,s_r}(t)]\right]\right]$$

where $p_{\Lambda'}(s_r \mid X_r)$ is the probability of word sequence candidate $s_r$ given utterance $X_r$ using previous model parameters $\Lambda'$, $\gamma_{i,r,s_r}(t)$ is the occupation probability of being in HMM state i at time point t given utterance feature vectors $X_r$ and word sequence candidate $s_r$, E is a factor controlling the learning rate and:

$$Q(\Lambda') = \prod_{r=1}^{R}\sum_{s_r} w(s_r)p_{\Lambda'}(s_r \mid X_r) \quad \text{EQ. 12}$$

Thus, $Q(\Lambda')$ is the product of weighted sums, where a weighted sum is formed for each utterance. In equations 10 and 11, $Q(\Lambda')$ is divided by $$\sum_{s_r} w(s_r)p_{\Lambda}\cdot(s_r \mid X_r)$$

to form a term that is equal to the product of weighted sums for all of the utterances except the current utterance r.

As shown in EQS. 10-12, for N-Best MCE optimized through growth transformation optimization, the probabilities of candidate word sequences are weighted by a weight $w(s_r)$ that is non-negative and that is different than one. This weighting allows candidate word sequences in addition to the best candidate word sequence to influence the updating of the mean and variance. As a result, it is thought that the mean and variance are more discriminative.

Figure 3:
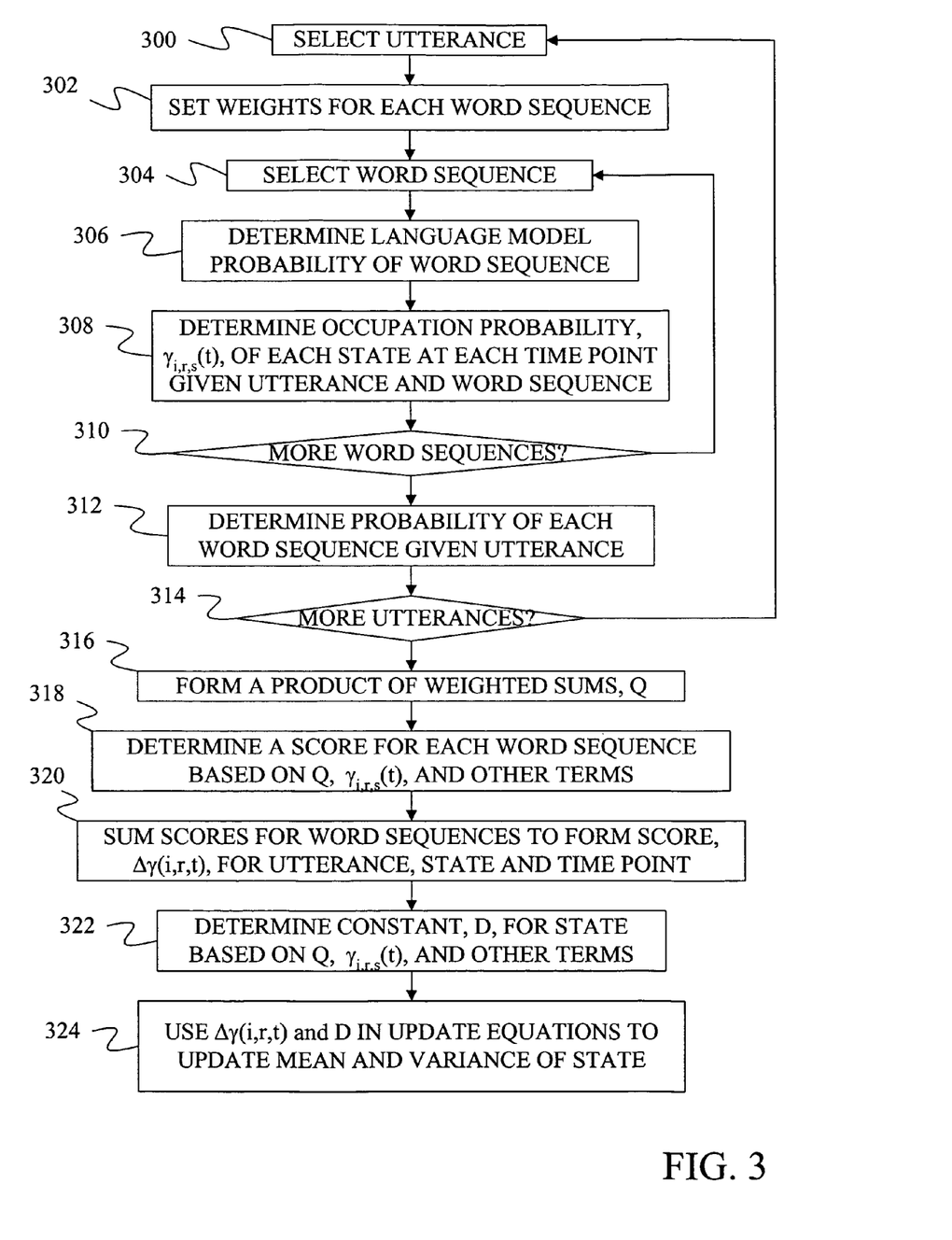
FIG. 3 is a method of updating model parameters using N-Best competitors.

FIG. 3 provides a flow diagram of a method of updating model parameters using N-Best update EQS. 8-12 above. In step 300, an utterance is selected and at step 302 weights for each word sequence of the selected utterance are determined. Under one embodiment, uniform weights are applied by setting the weight to $$\frac{1}{N},$$

where N is the number of competing candidate word sequences for each utterance (not including the true transcript). In other embodiments, the weight can be set as:

$$w(s_r) = \frac{p_{\Lambda'}(X_r \mid s_r)}{\sum_{i=1}^{N} p_{\Lambda'}(X_r \mid s_{r,i})}, sr \neq Sr \quad \text{EQ. 13}$$

where $$p_{\Lambda'}(X_r, s_r) = p_{\Lambda'}(X_r \mid s_r)p(s_r) \quad \text{EQ. 14}$$

where N is the number of competitor word sequences for utterance r, $s_{r,i}$ is the ith competitor word sequence for utterance r, $p_{\Lambda'}(X_r \mid s_r)$ is the probability of utterance feature vectors $X_r$ given the previous parameter set $\Lambda'$ and word sequence $s_r$, which is provided by decoder 102 when forming the N-Best competitors 106, and $p(s_r)$ is the language model probability of word sequence $s_r$. Note that for the true transcript $S_r$, its weight is always set to 1 by design.

At step 304 a word sequence from the N-Best list of word sequences for the selected utterance is selected.

At step 306, the language model probability of the selected word sequence is determined, if it was not already determined to set the weights for the word sequences at step 302. At step 308, the occupation probability, $\gamma_{i,r,s}(t)$, of each state and each time point in the selected utterance is determined for the selected word sequence. Under one embodiment, this occupation probability is determined by forming a lattice of possible states for the word sequence and using a forward-backward algorithm to determine the occupation probability of each state. Specifically, the occupation probability is determined as:

$$\gamma_{i,r,s_r}(t) = \frac{\alpha_t(i)\beta_t(i)}{\sum_{i=1}^{I}\alpha_T(i)} \quad \text{EQ. 15}$$

where $\alpha_t(i)$ is a forward path score for state i at time point t, $\beta_t(i)$ is the backward path score for state i at time t, T is the total number of time points or frames for utterance r, and I is the total number of states at time point T. The forward score and the backward score can be determined recursively as:

$$\alpha_t(i) = \left[\sum_{j=1}^{I} \alpha_{t-1}(j) a_{ji}\right] b_i(x_t) \qquad \text{EQ. 16}$$

$$\beta_t(i) = \sum_{j=1}^{I} \beta_{t+1}(j) a_{ij} b_j(x_{t+1}) \qquad \text{EQ. 17}$$

where $a_{ji}$ is the transition probability for transitioning from state j to state i, $a_{ij}$ is the transition probability for transitioning from state i to state j, $b_i(x_t)$ is the observation probability determined from the model parameters for state i given feature vector $x_t$ and $b_j(x_{t+1})$ is the observation probability determined from the model parameters for state j for feature vector $x_{t+1}$. In some embodiments, the lattice is constructed based on an alignment provided by decoder 102, which aligns speech units and feature vectors of the utterance. As such, at certain time points in the lattice, only a limited set of states is available in the lattice.

At step 310, the process determines if there are more word sequences for the given utterance. If there are more word sequences, the next word sequence is selected by returning to step 304. Steps 306 and 308 are then repeated for the new word sequence. When there are no more word sequences at step 310, the process continues at step 312 where a probability of each word sequence given the utterance is determined. This probability is determined as:

$$p(s_r | X_r) = \frac{p(X_r | s_r) p(s_r)}{\sum_{i=1}^{N} p(X_r | s_{r,i}) p(s_{r,i})} \qquad \text{EQ. 18}$$

where $p(s_r|X_r)$ is the probability of the word sequence given the utterance, $p(X_r|s_r)$ is the probability of the utterance given the word sequence $s_r$ which is provided by decoder 102, $p(s_r)$ is the language model probability of the word sequence, and $s_{r,i}$ is the ith competitor word sequence of the N competitor word sequences for utterance $X_r$.

At step 314, the process determines if there are more utterances. If there are more utterances, the process returns to step 300 to select the next utterance and steps 302 through 312 are repeated for the new utterance.

When all of the utterances have been processed at step 314, the method continues at step 316 where a product of weighted sums, $Q(\Lambda')$, is determined using EQ. 12 above. Note that in EQ. 12, a weighted sum is formed for each utterance by weighting each probability of a word sequence given an utterance by the weight for the word sequence. The weighted sums for the utterances are multiplied together to form $Q(\Lambda')$.

At step 318, for each combination of utterance r, state i, and time point t, a score is determined for each word sequence of utterance r using the portion of EQ. 10 within the outer summation. The scores for the word sequences are summed together for each utterance as indicated by EQ. 10 to form $\Delta\gamma(i,r,t)$ at step 320 for each combination of utterance r, state i, and time point t.

At step 322, Q and $\gamma_{i,r,s}(t)$ and other terms are used in EQ. 11 to determine $D_i$. At step 324, $\Delta\gamma(i,r,t)$ and $D_i$ are used in EQS. 8 and 9 above to update the mean and variance for state i. Specifically, in EQ. 8, the feature vector $x_i$ is multiplied by $\Delta\gamma(i,r,t)$ and the previous mean is multiplied by $D_i$.

Figure 4:
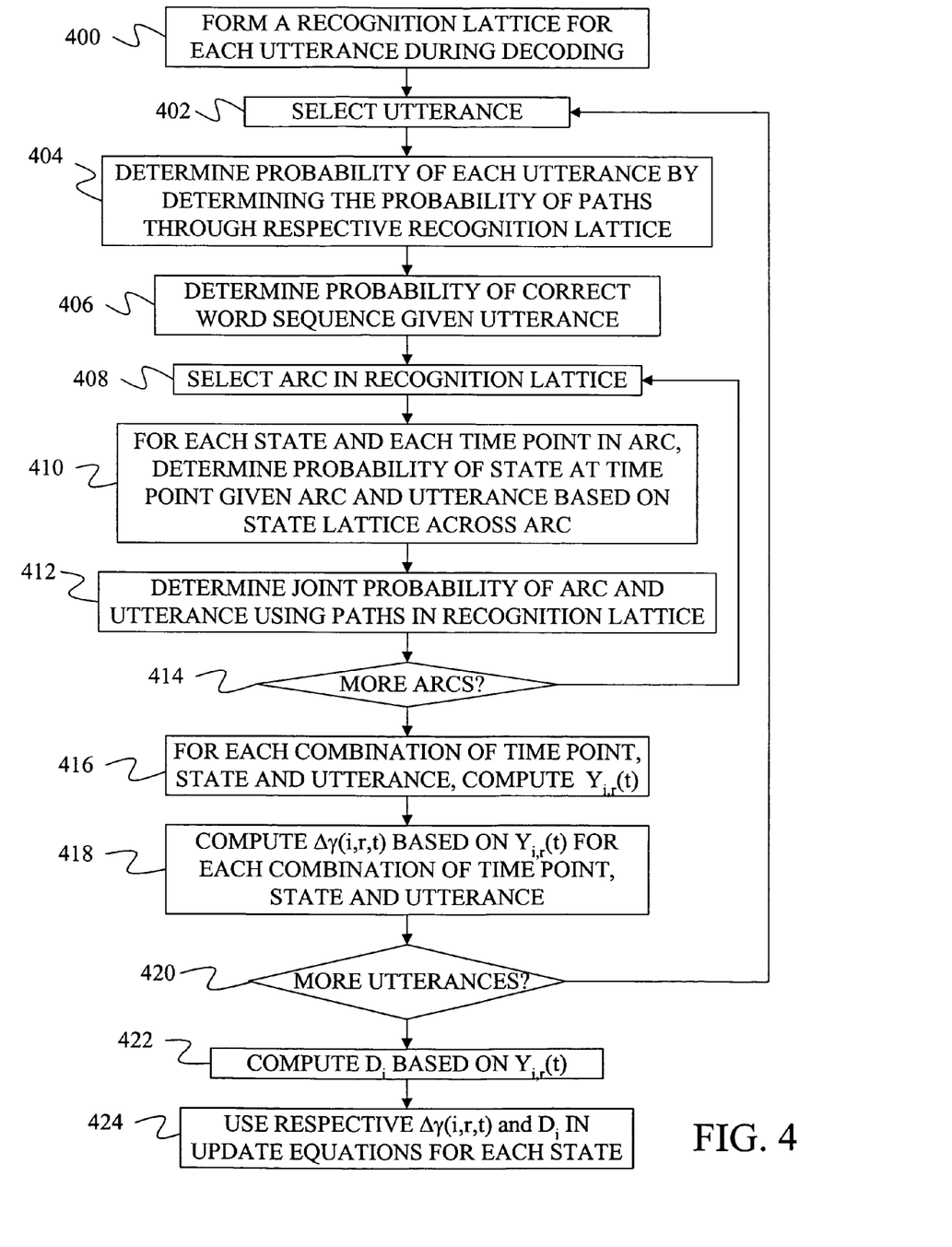
FIG. 4 is a method of updating model parameters using a lattice of competitors.

FIG. 4 provides a flow diagram for updating model parameters when decoder 102 provides a lattice of competitors 106 instead of an N-Best list.

Figure 5:
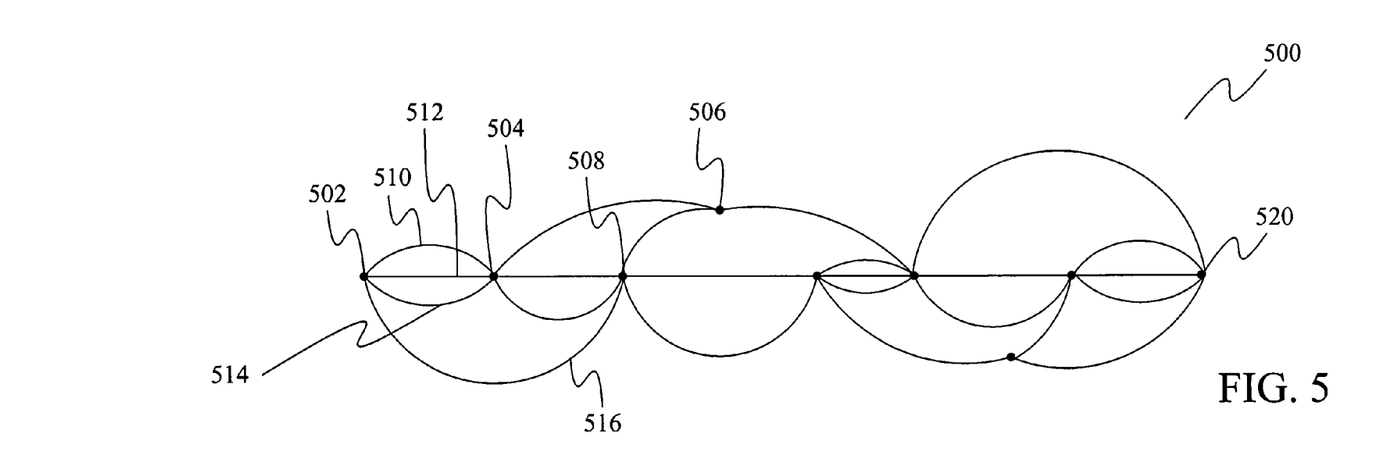
FIG. 5 is a lattice of competitor word sequences.

FIG. 5 provides an example word lattice 500 that could be used in the embodiment of FIG. 4. In word lattice 500, point 502 represents the beginning of the utterance and point 520 represents the end of the utterance, with the time span of the utterance equally divided along the horizontal axis of the lattice. Boundaries between words are shown as dots such as word boundaries 504, 506 and 508. Arcs between word boundaries represent a single word that spans the time points between the word boundaries. For example, the words on arcs 510, 512 and 514 all span the time points from beginning point 502 to word boundary 504. Word arc 516 represents a word spanning the time points from beginning point 502 to word boundary 508. Word sequences are formed by following a path from start point 502 to end point 520 and appending the words on each word arc along the path to form a word sequence. Note that each word arc can span multiple time points or frames of the utterance and that multiple word arcs can span the same time point or frame.

At step 400 of FIG. 4, a recognition lattice, such as recognition lattice 500 of FIG. 5, is formed for each utterance by decoder 102 during decoding. At step 402, one of the utterances is selected. At step 404, the probability of the selected utterance is determined by determining the probability of all of the paths through the respective recognition lattice. This is performed by determining forward path scores. Specifically, the forward path score at the end of an arc c is computed as:

$$\alpha(c) = \sum_{p(\text{preceding } c)} p_{\Lambda'}(c | p) p_{\Lambda'}(X_r(c) | c) \alpha(p) \qquad \text{EQ. 19}$$

where $p_{\Lambda'}(c|p)$ is the probability of the word on arc c given the preceding word p, which is determined using a bigram language model, $p_{\Lambda'}(X_r(c)|c)$ is the HMM probability of the utterance feature vectors of $X_r$ associated with word arc c given the word on arc c, which is provided by decoder 102 as part of decoding, and $\alpha(p)$ is the forward path score for preceding word p. The summation in EQ. 19 is taken over all arcs that end at the beginning of arc c.

The probability of the utterance is then determined as:

$$p(X_r) = \sum_{c: c \in \{\text{ending arcs}\}} \alpha(c) \qquad \text{EQ. 20}$$

where the summation is taken over all of the arcs that end at the end of the utterance.

At step 406, the probability of the correct word sequence given the utterance is determined as:

$$p_{\Lambda'}(S_r | X_r) = \frac{p_{\Lambda'}(X_r | S_r) p_{\Lambda'}(s_r)}{p_{\Lambda'}(X_r)} \qquad \text{EQ. 21}$$

where $p_{\Lambda'}(X_r)$ is determined using EQ. 20, $p_{\Lambda'}(X_r|S_r)$ is provided by the decoder, and $p_{\Lambda'}(S_r)$ is provided by a language model.

Figure 6:
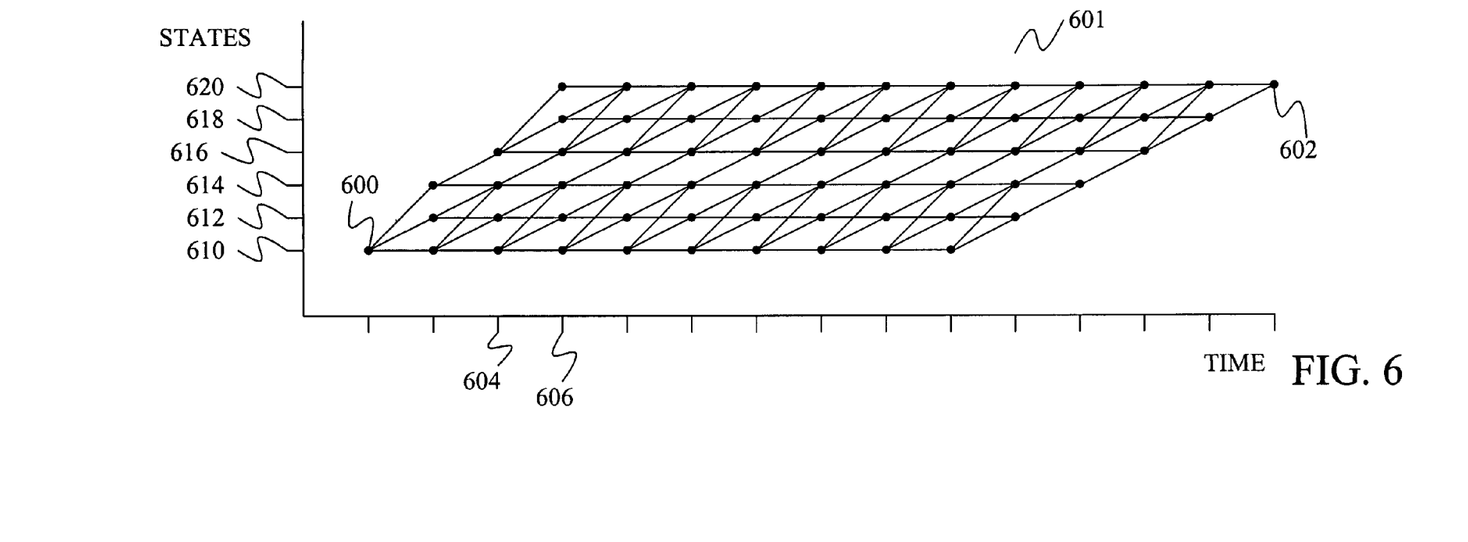
FIG. 6 is a lattice of states for an arc of the lattice of FIG. 5.

At step 408, an arc in the recognition lattice is selected and at step 410, for each state and time point in the selected arc, a probability of the state at that time point given the arc and the utterance is determined. Under one embodiment, this determination is made using a state lattice that begins at the beginning of the arc and ends at the end of the arc and is confined to the states associated with the phonemes of the word on the arc. FIG. 6 provides an example of such a state lattice 601. In FIG. 6, time is shown on the horizontal axis and HMM states are shown along the vertical axis. Time increases from left to right, with the arc beginning at state 600 and ending at state 602. At each time point, such as time points 604 and 606, only a limited number of states are available. For example, for time point 604 only states 610, 612, 614 and 616 are available. However, at time point 606, states 618 and 620 are also available. Those skilled in the art will recognize that state lattice 601 is a simplified example of a state lattice and that an actual state lattice for a word arc will include more states and will extend over a greater time period.

To determine the probability of a state at a time point given the arc and the utterance, the forward-backward recursion may be used. This forward-backward recursion to that described above for EQS. 15-17 with the recursions starting at the beginning and end of the arc instead of the entire word sequence. Thus, instead of EQ. 15, the following occupation probability is calculated at step 410:

$$\gamma_{i,r,c}(t) = \frac{\alpha_t(i)\beta_t(i)}{\sum_{i=1}^{I} \alpha_T(i)} \quad \text{EQ. 22}$$

where T is the number of frames spanned by the arc, and I is the number of states at the end of the arc.

At step 412, the joint probability of the selected arc and the utterance is determined using paths in the recognition lattice, such as recognition lattice 500 of FIG. 5. In particular, the joint probability is computed as:

$$p_{\Lambda'}(c, X_r) = \alpha(c)\beta(c) \quad \text{EQ. 23}$$

where $\alpha(c)$ is computed using EQ. 19 and $\beta(c)$ is a backward path score which is calculated as:

$$\beta(c) = \sum_{v(succeeding\ c)} p_{\Lambda'}(v|c) p_{\Lambda'}(X_r(v)|v)\beta(v) \quad \text{EQ. 24}$$

where v is a word arc succeeding word arc c, $p_{\Lambda'}(v|c)$ is the probability of succeeding word v given word c, which is computed using a bigram language model, $p_{\Lambda'}(X_r(v)|v)$ is the HMM probability of the feature vectors associated with word v given word v as provided by decoder 102 and $\beta(v)$ is the backward path score for word arc v.

In EQS. 19 and 24, $\alpha(c_0)$ are initialized to be equal to the prior probability of the word on arc $c_0$ times the HMM probability of the speech vectors associated with arc $c_0$ given arc $c_0$ as provided by decoder 102. $\beta(a)$ is initialized by setting $\beta(c_E)$ equal to one where $c_E$ are the ending arcs.

At step 414, the process determines if there are more arcs. If there are more arcs, the process returns to step 408 to select a new arc in the recognition lattice. Steps 410, 412 are then repeated for the new arc. When all of the arcs have been processed at step 414, the method continues at step 416 where a term, $Y_{i,r}(t)$, used to compute $\Delta\gamma(i,r,t)$ and $D_i$ is computed. Specifically, in the embodiment of FIG. 4, the weights for the word sequences are all set to $w(s_r)=1$ resulting in:

$$\Delta\gamma(i,r,t) = p_{\Lambda'}(S_r|X_r)\gamma_{i,r,s_r}(t) - p_{\Lambda'}(S_r|X_r)Y_{i,r}(t) \quad \text{EQ. 25}$$

$$D_i = E \cdot \sum_{r=1}^{R} p_{\Lambda'}(S_r|X_r) \sum_{t} Y_{i,r}(t) \quad \text{EQ. 26}$$

where $$Y_{i,r}(t) = \sum_{S_r} p_{\Lambda'}(s_r|X_r)\gamma_{i,r,s_r}(t) \quad \text{EQ. 27}$$

where $\gamma_{i,r,s_r}(t)$ of EQ. 25 is computed according to EQ. 15. To efficiently compute EQ. 27 for a lattice representation of competitors $s_r$, it is assumed that HMM state sequences are independent across arcs. In other words the occupancy probability $\gamma_{i,r,s_r}(t)$ can be approximated as being dependent only upon the word arc that contains the time point t and not upon the entire word sequence. Based on this assumption, EQ. 27 becomes:

$$Y_{i,r}(t) = \sum_{c:t\in[b_q,e_q]} \gamma_{i,r,c}(t) \cdot \frac{p_{\Lambda'}(c, X_r)}{p_{\Lambda'}(X_r)} \quad \text{EQ. 28}$$

where the summation is performed over all arcs that span time point t.

At step 418, EQ. 25 is used to compute $\Delta\gamma(i,r,t)$ for each combination of time points t and states i for the current utterance r. At step 420, the process determines if there are more utterances. If there are more utterances, the next utterance is selected at step 402 and the steps between step 402 and 420 are repeated for the new utterance. Once all of the utterances have been processed at step 420, the method continues at step 422 where EQ. 26 is used to compute $D_i$ for each state.

At step 424, $\Delta\gamma(i,r,t)$ and $D_i$ are used in EQS. 8 and 9 to update the model parameters for each state i.

Figure 7:
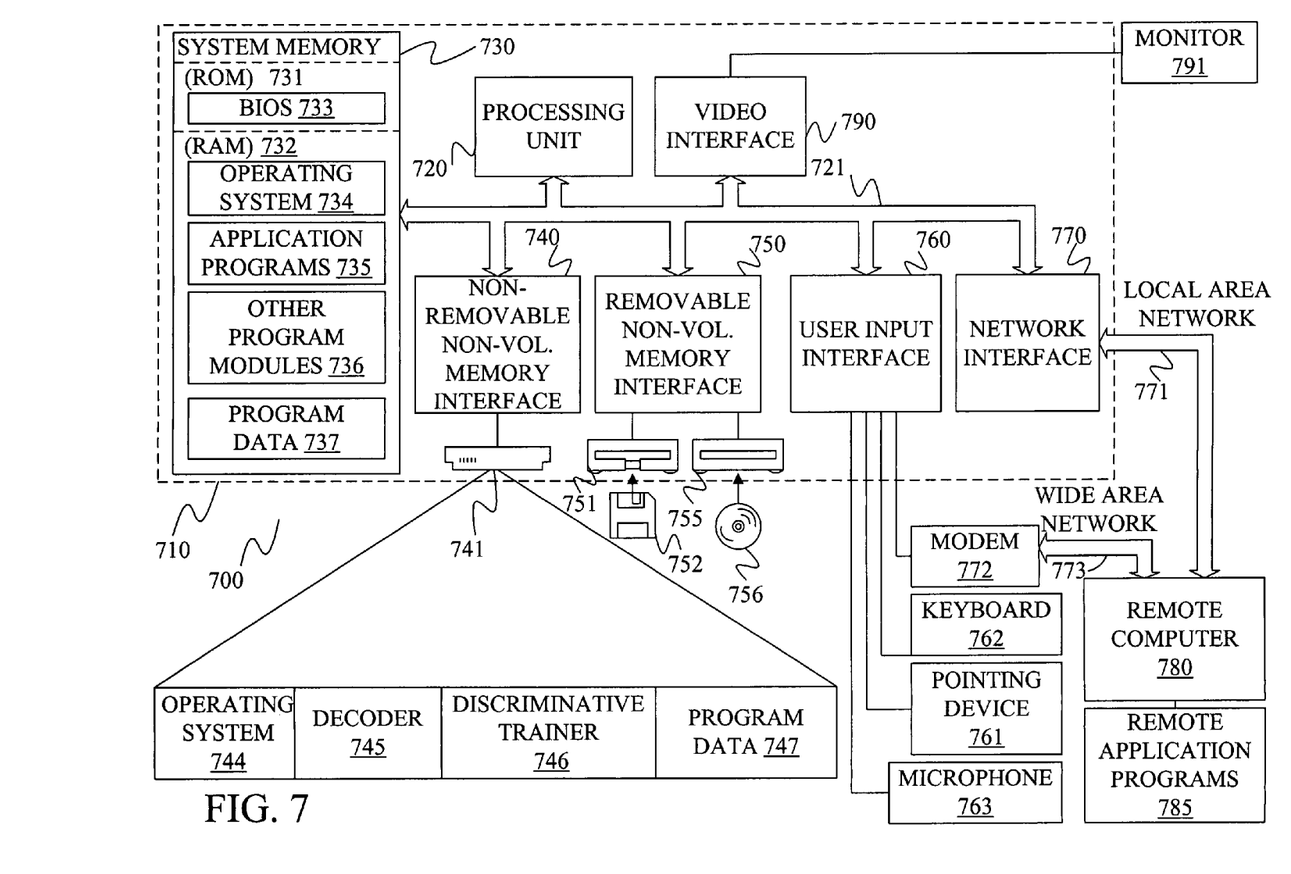
FIG. 7 is a general computing environment in which embodiments may be practiced.

FIG. 7 illustrates an example of a suitable computing system environment 700 on which embodiments may be implemented. The computing system environment 700 is only one example of a suitable computing environment and is not intended to suggest any limitation as to the scope of use or functionality of the claimed subject matter. Neither should the computing environment 700 be interpreted as having any dependency or requirement relating to any one or combination of components illustrated in the exemplary operating environment 700.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 7, an exemplary system for implementing some embodiments includes a general-purpose computing device in the form of a computer 710. Components of computer 710 may include, but are not limited to, a processing unit 720, a system memory 730, and a system bus 721 that couples various system components including the system memory to the processing unit 720.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, decoder 745, discriminative trainer 746, and program data 747, such as training utterances 104, baseline acoustic model 100, true transcript 110, and updated acoustic model 112 of FIG. 1.

A user may enter commands and information into the computer 710 through input devices such as a keyboard 762, a microphone 763, and a pointing device 761, such as a mouse, trackball or touch pad. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790.

The computer 710 is operated in a networked environment using logical connections to one or more remote computers, such as a remote computer 780. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on remote computer 780. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:

setting parameter values for a set of acoustic models used in speech recognition;

for each of a set of utterances, a decoder in a computing device decoding the utterance using the set of acoustic models to identify a set of competitor word sequences for the utterance and to determine a probability of each word sequence given the utterance;

setting a weight with a positive value that is different than one for at least one competitor word sequence of each utterance;

updating a parameter value in the set of acoustic models using a trainer through steps comprising:
for each competitor word sequence for a selected utterance, using the weight for the word sequence, the probability of the word sequence given the selected utterance and an occupation probability that describes the probability of being in a particular state of the acoustic model at a particular time given the selected utterance and the word sequence to form a score for the word sequence;
summing the scores for the word sequences as part of forming a score for the selected utterance, wherein forming the score for the selected utterance further comprises determining a term $$\frac{\prod_{r=1}^{R} \sum_{s_r} w(s_r) p_{\Lambda'}(s_r \mid X_r)}{\sum_{s_r} w(s_r) p_{\Lambda'}(s_r \mid X_r)},$$

where
$p_{\Lambda'}(s_r|X_r)$ is the probability of word sequence candidate $s_r$ given selected utterance $X_r$ using parameter values $\Lambda'$, $w(s_r)$ is a non-negative weighting factor for competitor word sequence $s_r$, and R is the total number of utterances in the set of utterances such that the term is equal to the product of weighted sums for all of the utterances except the selected utterance $X_r$; and
using the score for the selected utterance to update a parameter value.

2. The method of claim 1 wherein updating a parameter value comprises using an update equation that is formed by using a growth-transformation optimization technique on a minimum classification error objective function.

3. The method of claim 2 wherein using a growth-transformation optimization technique comprises defining the minimum classification error objective function as a rational function.

4. The method of claim 1 wherein using the score for the selected utterance comprises multiplying the score for the selected utterance by a feature vector from the selected utterance associated with the particular time.

5. The method of claim 1 wherein using the score for the selected utterance to update a parameter value comprises using the score for the selected utterance to update a mean and a variance associated with the particular state.

6. A method comprising:
setting parameter values for a set of acoustic models used in speech recognition;
for each of a set of utterances, decoding the utterance using the set of acoustic models to identify a set of competitor word sequences for the utterance and for each word sequence determining a probability of the utterance given the word sequence;
updating a parameter value in the set of acoustic models using a trainer in a computing device through steps comprising:
constructing a recognition lattice for each utterance, the recognition lattice comprising a set of arcs with one word for each arc;
for each arc that spans a selected time point:
determining a probability, $\gamma_{i,r,c}(t)$, of a selected state at the selected time point given the arc and a selected utterance using a first forward-backward recursion with the recursions starting at the beginning and the end of the arc;
determining a joint probability, $p_{\Lambda'}(c,X_r)$, of the arc and the selected utterance using a second forward-backward recursion with the forward recursion starting at the beginning of the utterance and the backward recursion starting at the end of the utterance;
determining a probability, $p_{\Lambda'}(X_r)$, of the selected utterance; and using the probability of the selected state given the arc and the selected utterance, the joint probability of the arc and the selected utterance and the probability of the selected utterance to form a value for the arc; and
summing the values for the arcs that span the selected time point to compute a term $$Y_{i,r}(t) = \sum_{c:t\in[b_q,e_q]} \gamma_{i,r,c}(t) \cdot \frac{p_{\Lambda'}(c, X_r)}{p_{\Lambda'}(X_r)}$$

used in updating a model parameter for the selected state.

7. The method of claim 6 wherein the term is multiplied by a feature vector formed from the utterance and associated with the selected time point as part of updating the model parameter.

8. The method of claim 7 wherein the probability of the selected state, the joint probability of the selected arc and the selected utterance and the probability of the selected utterance are used to compute a second term used in updating the model parameter and wherein the second term is multiplied by the model parameter as part of updating the model parameter.

9. The method of claim 6 wherein determining the probability of the selected state comprises:
forming a state lattice of acoustic model states from the beginning of the arc to the end of the arc;
determining a forward path score from the beginning of the arc to the selected state at the selected time point in the state lattice and backward path score from the end of the arc to the selected state at the selected time point in the state lattice; and
using the forward path score and the backward path score to determine the probability of the selected state at the selected time point.

10. The method of claim 6 wherein determining the joint probability comprises computing a forward path score from the start of the recognition lattice to the end of the arc and computing a backward path score from the end of the recognition lattice to the end of the arc.

11. The method of claim 6 wherein determining the probability of the utterance comprises determining forward path scores from the beginning of the recognition lattice to the end of the recognition lattice and summing the forward path scores at the end of the recognition lattice to form the probability of the utterance.

12. The method of claim 6 wherein determining a term further comprises determining the probability of a correct word sequence given the utterance.

13. The method of claim 12 wherein determining the probability of the correct word sequence given the utterance comprises determining the language model probability of the correct word sequence, and using the language model probability, the probability of the utterance and the probability of the utterance given the correct word sequence as determined during decoding to determine the probability of the correct word sequence given the utterance.

14. A computer storage medium having computer-executable instructions for performing steps comprising:
forming a recognition lattice of possible word sequences that were decoded from an utterance using an acoustic model;
determining a probability, $p_{\Lambda'}(X_r)$, for the utterance;
for each arc in the recognition lattice that spans a selected time point:
determining a probability, $\gamma_{i,r,c}(t)$, of a selected state given the arc and the utterance using a forward-backward recursion with the recursions starting at the beginning and the end of the arc;
determining a joint probability, $p_{\Lambda'}(c,X_r)$, of the arc and the utterance using a forward-backward recursion with the forward recursion starting at the beginning of the lattice and the backward recursion starting at the end of the lattice;
using the probability of the state given the arc and the utterance, the joint probability of the arc and the utterance and the probability of the utterance to form a value for the arc; and
using a sum $$\sum_{c:t\in[b_q,e_q]} \gamma_{i,r,c}(t) \cdot \frac{p_{\Lambda'}(c, X_r)}{p_{\Lambda'}(X_r)}$$

of the values for the arcs that spans the selected time point as part of updating a model parameter for the selected state.

15. The computer storage medium of claim 14 wherein determining a probability of a state given the arc and the utterance comprises:
forming a state lattice for states and time points spanned by the arc;
determining a forward path score from the beginning of the arc to the state through the state lattice based on the portion of the utterance associated with the arc;
determining a backward path score from the end of the arc to the state through the state lattice based on the portion of the utterance associated with the arc; and
using the forward path score and the backward path score to determine the probability for the state.

16. The computer storage medium of claim 14 wherein updating the model parameters comprises applying the sum of the values for the arcs to an update equation determined by optimizing a minimum classification error objective function.

17. The computer storage medium of claim 14 wherein the sum of the values for the arcs is used in a first term and a second term, wherein the first term is multiplied by a feature vector for the utterance associated with the selected time point and the second term is multiplied by a mean associated with the state as part of forming an updated mean for the state.

* * * * *